(No Model.)
W. S. BECHTOL & W. T. BESSONETTE.
ANIMAL SHEARS.
No. 421,024. Patented Feb. 11, 1890.
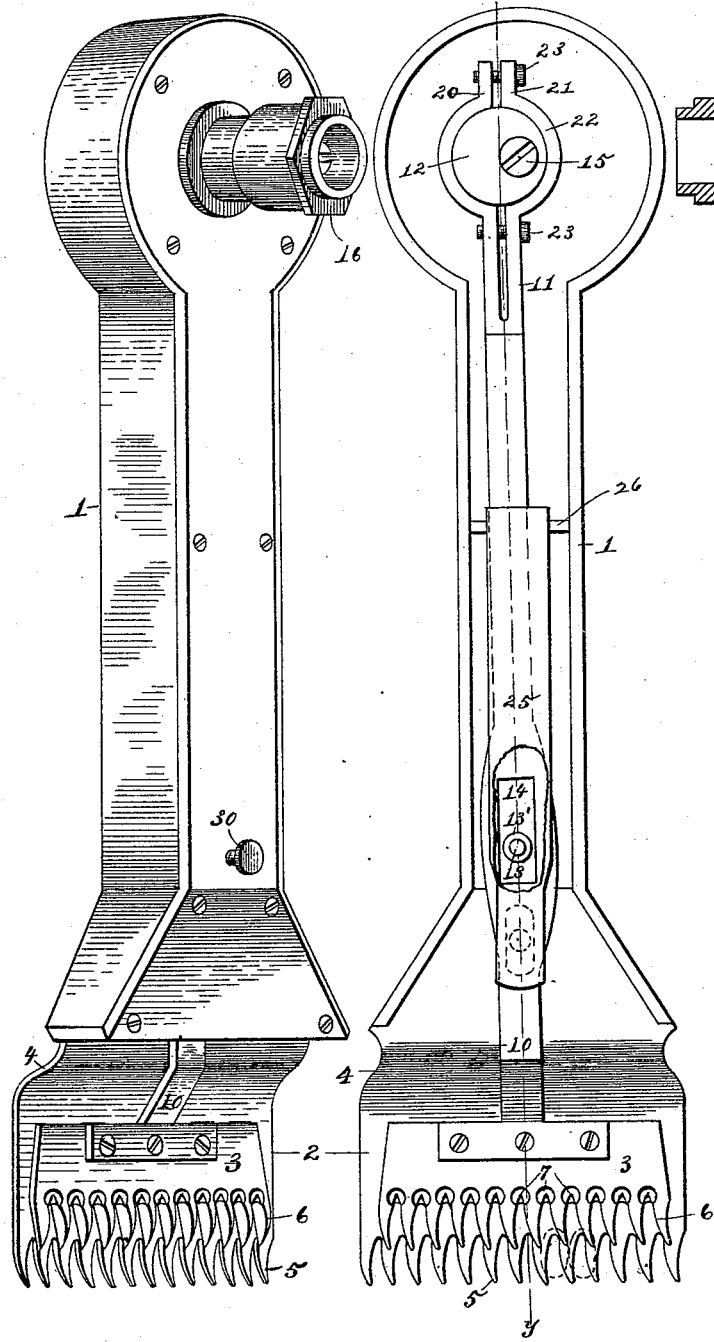
WITNESSES:
Percy C. Bowen.
H. T. Bernhard
INVENTORS:
Wm. S. Bechtol and
Wm. T. Bessonette.
By Edson Bros,
Attorneys.

UNITED STATES PATENT OFFICE.

WILLIAM S. BECHTOL AND WILLIAM T. BESSONETTE, OF LAMPASAS, TEXAS; SAID BESSONETTE ASSIGNOR TO SAID BECHTOL.

ANIMAL-SHEARS.

SPECIFICATION forming part of Letters Patent No. 421,024, dated February 11, 1890.

Application filed June 11, 1889. Serial No. 313,894. (No model.)

*To all whom it may concern:*

Be it known that we, WILLIAM S. BECHTOL and WILLIAM T. BESSONETTE, of Lampasas, in the county of Lampasas and State of Texas, have invented certain new and useful Improvements in Animal-Shears; and we do hereby declare the following to be a full, clear, and exact description of the invention, such as will enable others skilled in the art to which it appertains to make and use the same.

Our invention relates to improvements in animal-shears; and it consists of the combination of devices and peculiar construction and arrangement of parts, as will be hereinafter fully described and claimed.

Among other things, our invention has for its object to provide an animal-shears with mechanism for imparting a combined reciprocating and edgewise play to the cutting knife or knives in order to cause the teeth of said knife or knives to follow or describe a curved or oval path, and thus insure greater efficiency of operation; to provide for the proper lateral contact of the knives in order to insure their proper action and to regulate the pressure or force with which one knife bears on the other; to provide a peculiar form of cutter-teeth which shall be automatic or self-cleaning in order to avoid clogging of the knives, and, finally, to improve the parts in details of construction with a view to reducing the friction and wear to a minimum, and promoting simplicity and durability of construction.

To enable others to more fully understand our invention, we will now proceed to a detailed description thereof in connection with the accompanying drawings, in which—

Figure 1 is a perspective view. Fig. 2 is a top or plan view, with the top of the casing removed. Fig. 3 is a central longitudinal vertical sectional view of the machine on the plane indicated by the dotted line *y y* of Fig. 2. Fig. 4 is an enlarged detail view of a part of one of the knife-bars.

Like numerals of reference denote corresponding parts in all the figures of the drawings, referring to which—

1 designates the longitudinal case or shell which contains the operating mechanisms, and is adapted to serve as a handle for manipulating the implement. This case is rounded and enlarged at one end to receive the eccentric and connection between the latter and the pitman, to permit said parts to rotate without coming in contact with the shell, and the opposite end of the case or shell is flared or enlarged; but we would have it understood that we do not restrict ourselves to this particular form of case or shell, as we are aware that it can be changed and varied at pleasure.

2 3 designate the knives or knife-bars of our improved animal-shears, one of which 2 is preferably stationary, while the other 3 has a combined reciprocating and edgewise play or movement imparted thereto. The stationary knife has a bent shank 4 made integral therewith, which shank is reduced in width and fitted in one side of the open flared end of the case or shell 1, to which it is firmly and rigidly attached, preferably by means of screws. The two knives are preferably made of flat smooth plates of metal, which are fitted laterally together so as to be capable of moving freely one upon the other, and each knife or knife-bar is provided at one edge with a series of cutter-teeth 5 6, each tooth being preferably tapered longitudinally and provided with sharpened side cutting-edges to adapt said teeth when they pass each other to shear the wool off the animal. At the base or juncture of two adjoining, or each pair of teeth with the movable knife-bar 3 we provide a cavity or depression 7, which opens through the edge of the knife-bar and is adapted to receive any matter—such as dirt, clippings, &c.—that may remain between the teeth and discharge the same from the knife, whereby the knife is made automatic or self-cleaning and clogging of the parts is obviated, as will be readily understood by those skilled in the art to which my invention relates.

The movable knife-bar is fixed to and carried by a pitman 10, which is arranged longitudinally within the case or shell 1, and this pitman is made of two parts or members, the upper 11 of which connects with the eccentric 12 in such a manner, presently described, as to move with the eccentric to the extent or limit permitted by a fixed guide pin or roller 13, that works in a longitudinal slot 14, formed in the pitman 11 at an intermediate point of its length. The eccentric 12 is carried by a driving-shaft 15, which is journaled in the sides of the case or shell 1 at the enlarged rounded part thereof, and one end of this shaft is extended beyond the case to adapt a flexible power-shaft (not shown) of any preferred pattern to be connected to the shaft 15, in order to rotate the latter. The exposed end of the driving-shaft and the connection (not shown) between the latter and the power-shaft are concealed and protected by means of a tubular sectional housing 16, one section of which is rigidly secured to the case or shell and the other is detachably secured to the fixed member, as shown. The guide-pin 13 is rigidly secured to one side of the case or shell, and around it is loosely fitted a friction-roller 13' to reduce the friction and wear between the edges of the slot 14 in the pitman and said guide 13, and the pin and its roller are of less diameter than the width of the slot 14, to enable the pitman to have a limited lateral or edgewise play in addition to the necessary endwise or reciprocating movement. The upper member 11 of the pitman is divided longitudinally for a suitable distance to provide two yielding or spring arms 20 21, which are integral with the pitman member and which are bowed or curved, as at 22, at intermediate points of their length to adapt them to be fitted snugly around the eccentric, said spring-arms being forced or pressed into close contact, yielding with the eccentric, by means of adjusting-screws 23, which draw them together and cause them to bind so firmly on the eccentric that the pitman follows the eccentric to the limit permitted by the fixed guide operating in its slot.

The pitman and movable knife-bar are normally forced toward the fixed knife-bar, so as to insure the necessary close union between the two knife-bars by means of a pressure-spring 25, which is preferably arranged longitudinally within the case or shell. One end of this spring-bar is secured on a pin or shaft 26, which is fixed in the case or shell 1, and the other end of said spring presses, through an intermediate ball-bearing or friction-roller 27, against the pitman. This ball-bearing or friction-roller tends to reduce the friction and wear between the pressure-spring and the movable pitman, and it is confined in place by means of spaced or separated shoulders 28, formed on the opposing faces of the pitman and spring, and which also serve to allow a limited play of said ball or roller. The pressure or force of the spring on the pitman can be varied by means of a regulating-screw 30, which operates in a suitable threaded opening in the case and bears against the outer face of the spring.

This being the construction of our improved sheep-shears, the operation thereof is as follows: Power is applied to the driving-shaft to rotate the latter, and the eccentric imparts an endwise-reciprocating movement to the pitman. The spring or yielding connection between the pitman and eccentric causes the pitman to follow the motion or path of the eccentric to the extent permitted by the fixed guide 13, that operates in the slot of the pitman, and by impinging against the side edges of said slot serves to limit the lateral or edgewise play of the pitman. This combined movement of the pitman and movable knife-bar causes the teeth on the knife-bar to follow or describe a curved or oval course, and as they pass the cutter-teeth on the fixed knife-bar the wool is severed with accuracy and ease. The spring serves to insure the necessary contact between the two knife-bars, and the teeth are self-cleaning to avoid clogging, as is obvious from the foregoing description.

We are aware that changes and alterations in the form and proportions of parts and details of construction can be made without departing from the spirit of our invention, and hence we do not confine ourselves strictly to the exact details of the mechanisms herein shown and described as an embodiment of our invention.

Having thus fully described our invention, what we claim as new, and desire to secure by Letters Patent, is—

1. In an animal-shears, the combination of the knives, an eccentric, and a pitman having one of the knives secured thereto and connected to the eccentric by a yielding friction-connection, substantially as and for the purpose described.

2. In an animal-shears, the combination of the knives, an eccentric, a pitman secured to one of the knives and having a yielding friction-connection with the eccentric to insure an endwise and edgewise play of the pitman and one of the knives, and a fixed stop connected to the pitman for limiting its edgewise play, substantially as and for the purpose described.

3. In an animal-shears, the combination of the knives, an eccentric, a pitman secured to one of the knives and having spring-arms which clasp the eccentric, and adjusting devices whereby said arms are drawn together, substantially as described, for the purpose set forth.

4. In an animal-shears, the combination of the fixed and movable knives, an eccentric, and a pitman connected at one end to the movable knife and having a yielding friction-connection with the eccentric, said pitman having a longitudinal slot at an intermediate point of its length and a fixed stop fitted in the slot of the pitman, the diameter of the stop being less than the width of the slot in the pitman, for the purpose described, substantially as set forth.

5. In an animal-shears, the combination, with a case or shell having a fixed knife, and a pitman carrying a movable knife, of a longitudinal spring supported within the case and having an anti-friction bearing against the pitman and a regulating-screw fitted in said case and bearing against the spring, substantially as described, for the purpose specified.

6. In an animal-shears, the combination, with a case or shell having a fixed knife, of a pitman carrying a movable knife and having the stop-shoulders at intermediate points of its length, a spring arranged longitudinally within the case alongside of the pitman and likewise having stop-shoulders which face the shoulders on the pitman, and a ball-bearing or friction-roller fitted between the spring and pitman and prevented by the shoulders thereof from displacement, all arranged and combined substantially as and for the purpose described.

7. In an animal-shears, the cutting mechanism consisting of two knife-bars, each having a series of cutter-teeth, the movable knife-bar having a series of depressions or cavities 7 at its edge, a cavity being located at the juncture of each pair of teeth formed on said movable knife-bar, for the purpose described, substantially as set forth.

In testimony whereof we affix our signatures in presence of two witnesses.

WILLIAM S. BECHTOL.
WILLIAM T. BESSONETTE.

Witnesses:
H. N. KEY,
T. H. HAYNIE.